(12) United States Patent
Liu

(10) Patent No.: US 12,695,558 B2
(45) Date of Patent: Jul. 28, 2026

(54) CHANNEL TRANSMISSION METHOD AND APPARATUS, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 514 days.

(21) Appl. No.: 18/044,753

(22) PCT Filed: Sep. 30, 2020

(86) PCT No.: PCT/CN2020/119604
§ 371 (c)(1),
(2) Date: Mar. 9, 2023

(87) PCT Pub. No.: WO2022/067741
PCT Pub. Date: Apr. 7, 2022

(65) Prior Publication Data
US 2023/0361947 A1 Nov. 9, 2023

(51) Int. Cl.
H04L 5/00 (2006.01)
H04L 1/08 (2006.01)

(52) U.S. Cl.
CPC .............. H04L 5/0035 (2013.01); H04L 1/08 (2013.01); H04L 5/0051 (2013.01)

(58) Field of Classification Search
CPC ....... H04L 5/0035; H04L 1/08; H04L 5/0051; H04L 5/0023; H04L 27/2602;
(Continued)

(56) References Cited

U.S. PATENT DOCUMENTS

2020/0067674 A1 2/2020 Guan et al.
2022/0400501 A1* 12/2022 Kang .................... H04L 5/0012
(Continued)

FOREIGN PATENT DOCUMENTS

EP 3562059 A1 10/2019
WO WO 2020044409 A1 3/2020
WO 2020091579 A1 5/2020

OTHER PUBLICATIONS

Examination Report for India Application No. 202347026599, issued on Oct. 4, 2023, 6 pages.
(Continued)

*Primary Examiner* — Rownak Islam
(74) *Attorney, Agent, or Firm* — Finnegan, Henderson, Farabow, Garrett & Dunner, L.L.P.

(57) ABSTRACT

A method for channel transmission, includes: mapping respectively, by a terminal based on a predetermined mapping mode, different beam indication information to be received by corresponding different transmission and receiving points (TRPs) of a base station, to a plurality of candidate repetition occasions, wherein the beam indication information is beam related information for transmission of a physical uplink shared channel (PUSCH); and performing, by the terminal, one of transmitting repeatedly a transmission block on the PUSCH or only transmitting separately a corresponding demodulation reference signal (DMRS), on a plurality of target repetition occasions, based on beam indication information corresponding respectively to the plurality of target repetition occasions.

18 Claims, 7 Drawing Sheets taking a plurality of second actual repetition occasions as the plurality of target repetition occasions, in response to determining that there is a first actual repetition occasion in the K2' actual repetition occasions — 202-61 transmitting repeatedly the transmission block on the PUSCH on the plurality of second actual repetition occasions, based on beam indication information corresponding to the plurality of second actual repetition occasions — 202-62

(58) Field of Classification Search
CPC ... H04L 5/0044; H04L 5/0091; H04L 27/261; H04B 7/0695; H04W 72/1268
USPC .......................................................... 370/329
See application file for complete search history.

(56) References Cited

U.S. PATENT DOCUMENTS

| | | | | |
|---|---|---|---|---|
| 2023/0140970 A1 * | 5/2023 | Lin | .......................... | H04L 1/189 |
| | | | | 370/329 |
| 2023/0171770 A1 * | 6/2023 | Chen | ................ | H04W 72/1268 |
| | | | | 370/329 |
| 2023/0319819 A1 * | 10/2023 | Wang | .................... | H04L 5/0048 |
| | | | | 370/336 |

OTHER PUBLICATIONS

European Patent Office, Extended European Search Report issued in Application No. 20955764.4, dated Oct. 25, 2023, 11 pages.

Nokia, Nokia Shanghai Bell, "Enhancements for Multi-TRP URLLC schemes", 3GPP TSG RAN WG1 #102, R1-2006844, e-Meeting, Aug. 17-28, 2020, 8 pages.
Huawei, HiSilicon, "Other issues on NR eMIMO in R16", 3GPP TSG RAN WG1 Meeting #99, R1-1912920, Reno, USA, Nov. 18-22, 2019, 4 pages.
International Search Report and Written Opinion of International Application No. PCT/CN2020/119604, dated Jun. 24, 2021, 13 pages.
Huawei, HiSilicon, Enhancements on multi-TRP/panel transmission, 3GPP TSG RAN WG1 Meeting #98bis, R1-1910073, Chongqing, China, Oct. 14-20, 2019, 30 pages.
Spreadtrum Communications, Discussion on enhancements on Multi-TRP for PDCCH, PUCCH and PUSCH, 3GPP TSG RAN WG1 #102-e, R1-2006258, e-Meeting, Aug. 17-28, 2020, 5 pages.
Search Report for European Application No. 20 955 764.4, dated Dec. 5, 2025, 9 pages.

\* cited by examiner mapping respectively, by a terminal based on a predetermined mapping mode, different beam indication information to be received by corresponding different TRPs of a base station, to a plurality of candidate repetition occasions — 201 transmitting repeatedly a transmission block on the PUSCH or only transmitting separately a corresponding DMRS, on a plurality of target repetition occasions, based on beam indication information corresponding respectively to the plurality of target repetition occasions — 202

FIG. 2

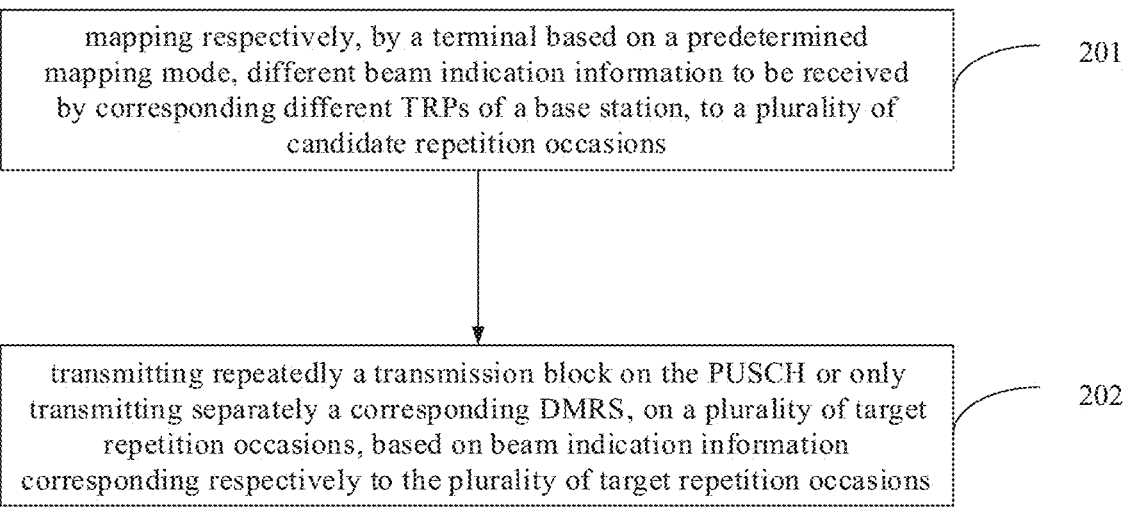

slot boundary          slot boundary          slot boundary

Rep#1          Rep#2          Rep#3          Rep#4

TCI-1          TCI-2          TCI-1          TCI-2

FIG. 3 taking a plurality of second repetition occasions in the K1 nominal repetition occasions as the plurality of target repetition occasions in response to determining that there is a first repetition occasion in the K1 nominal repetition occasions — 202-11 transmitting repeatedly the transmission block on the PUSCH on the plurality of second repetition occasions, based on beam indication information corresponding respectively to the plurality of second repetition occasions — 202-12

FIG. 4

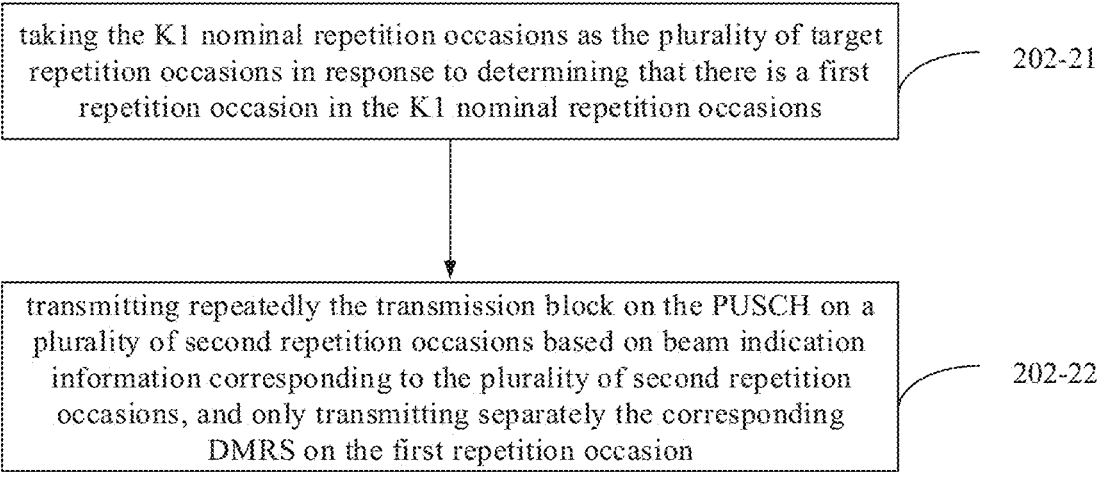

taking the K1 nominal repetition occasions as the plurality of target repetition occasions in response to determining that there is a first repetition occasion in the K1 nominal repetition occasions — 202-21 transmitting repeatedly the transmission block on the PUSCH on a plurality of second repetition occasions based on beam indication information corresponding to the plurality of second repetition occasions, and only transmitting separately the corresponding DMRS on the first repetition occasion — 202-22

FIG. 5

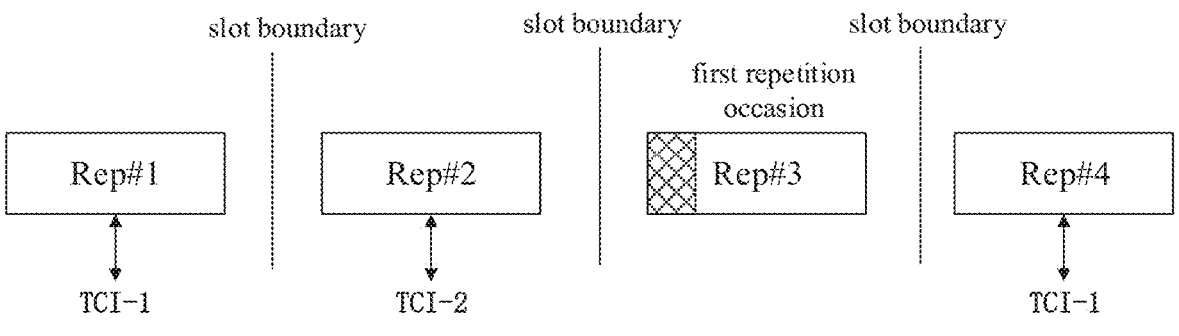

slot boundary         slot boundary         slot boundary first repetition occasion

| Rep#1 | Rep#2 | Rep#3 | Rep#4 |

TCI-1         TCI-2                 TCI-1

FIG. 6

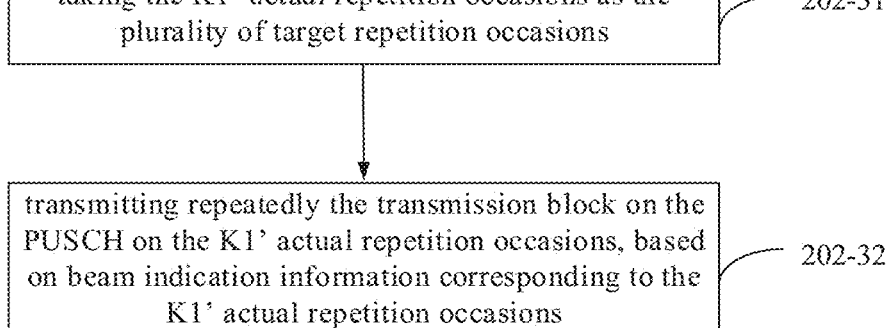

taking the K1' actual repetition occasions as the plurality of target repetition occasions — 202-31 transmitting repeatedly the transmission block on the PUSCH on the K1' actual repetition occasions, based on beam indication information corresponding to the K1' actual repetition occasions — 202-32

FIG. 7

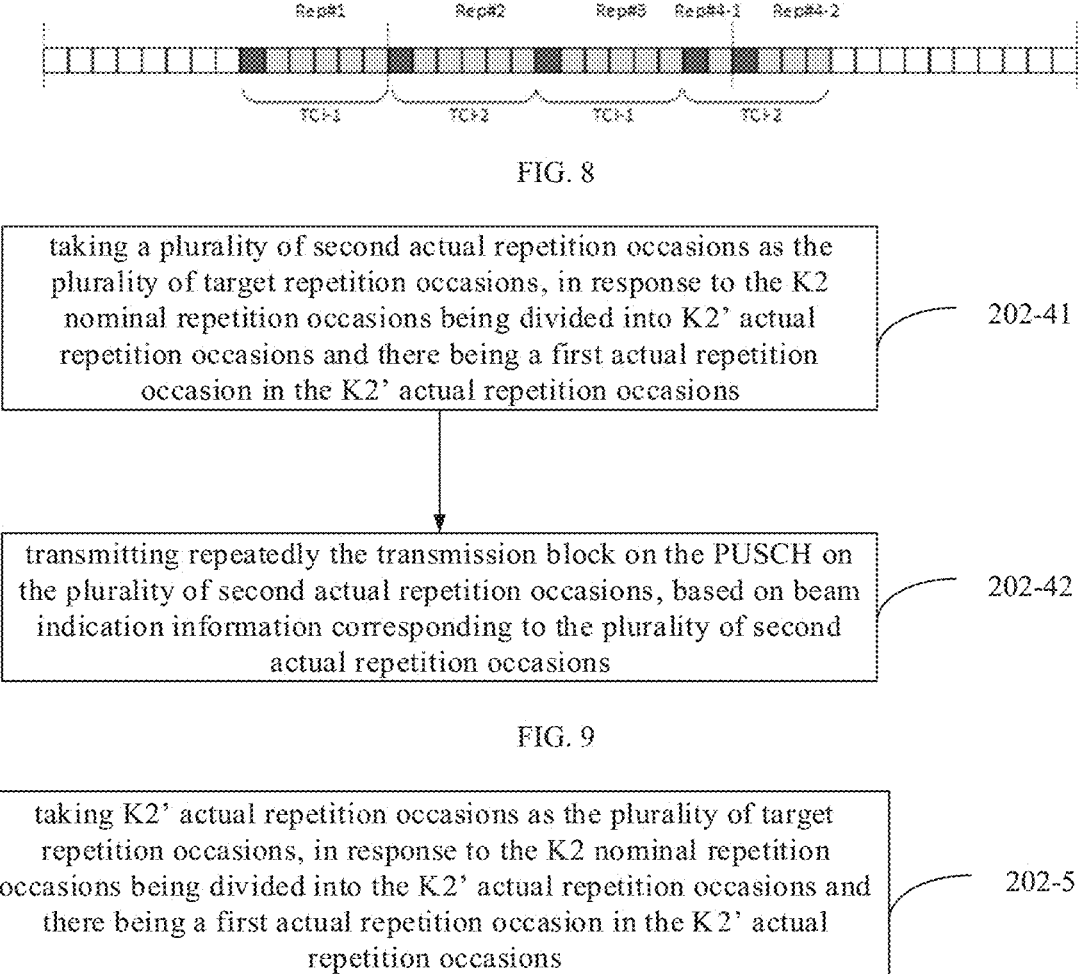

FIG. 8 taking a plurality of second actual repetition occasions as the plurality of target repetition occasions, in response to the K2 nominal repetition occasions being divided into K2' actual repetition occasions and there being a first actual repetition occasion in the K2' actual repetition occasions          202-41 transmitting repeatedly the transmission block on the PUSCH on the plurality of second actual repetition occasions, based on beam indication information corresponding to the plurality of second actual repetition occasions          202-42

FIG. 9 taking K2' actual repetition occasions as the plurality of target repetition occasions, in response to the K2 nominal repetition occasions being divided into the K2' actual repetition occasions and there being a first actual repetition occasion in the K2' actual repetition occasions          202-51 transmitting repeatedly the transmission block on the PUSCH on a plurality of second actual repetition occasions based on beam indication information corresponding to the plurality of the second actual repetition occasions, and only transmitting separately the corresponding DMRS on the first actual repetition occasion          202-52

FIG. 10

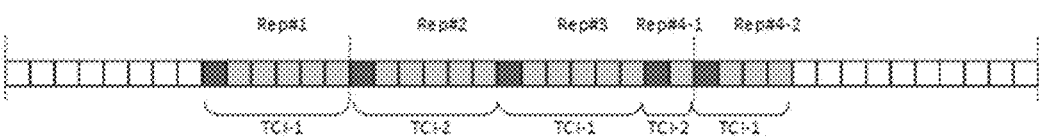

FIG. 11

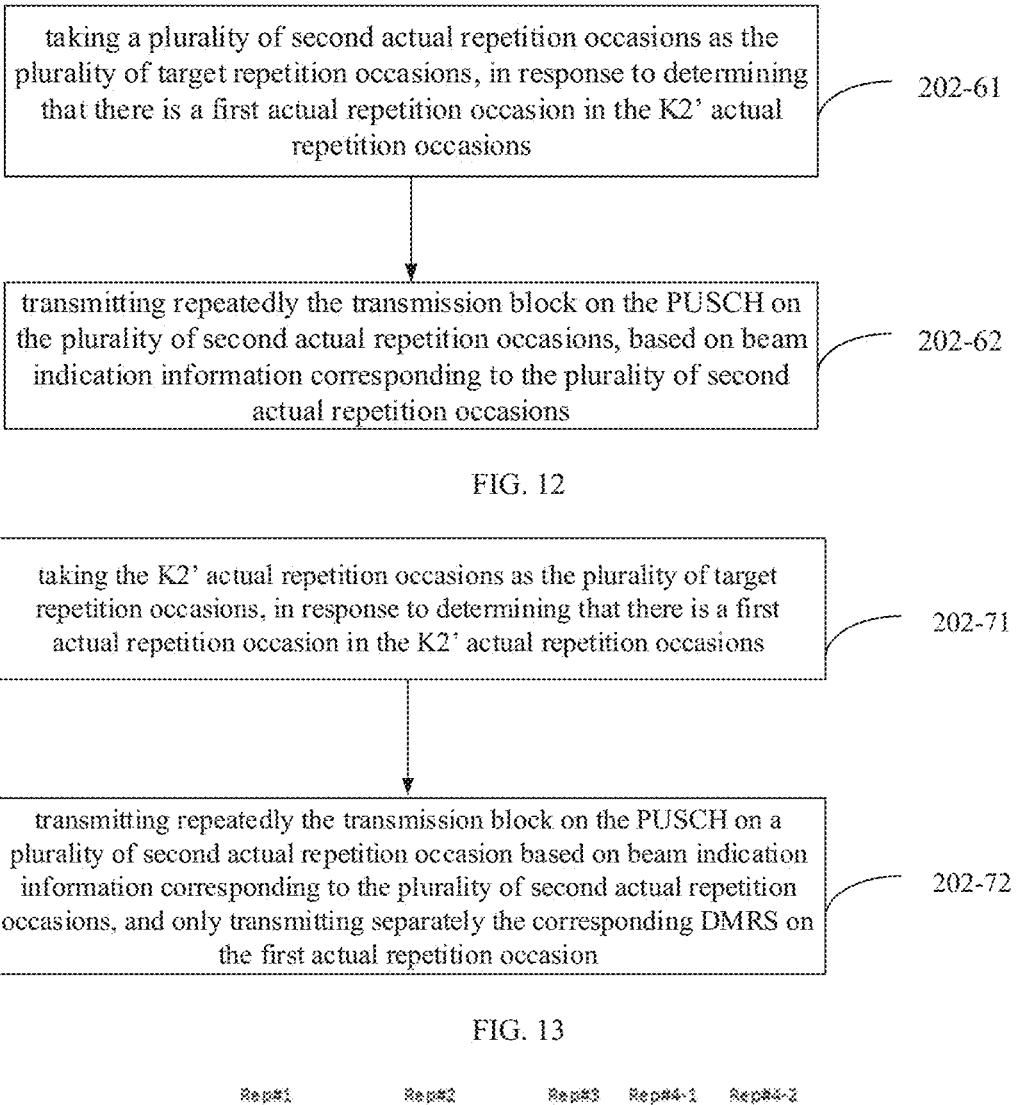

taking a plurality of second actual repetition occasions as the plurality of target repetition occasions, in response to determining that there is a first actual repetition occasion in the K2' actual repetition occasions — 202-61 transmitting repeatedly the transmission block on the PUSCH on the plurality of second actual repetition occasions, based on beam indication information corresponding to the plurality of second actual repetition occasions — 202-62

FIG. 12 taking the K2' actual repetition occasions as the plurality of target repetition occasions, in response to determining that there is a first actual repetition occasion in the K2' actual repetition occasions — 202-71 transmitting repeatedly the transmission block on the PUSCH on a plurality of second actual repetition occasion based on beam indication information corresponding to the plurality of second actual repetition occasions, and only transmitting separately the corresponding DMRS on the first actual repetition occasion — 202-72

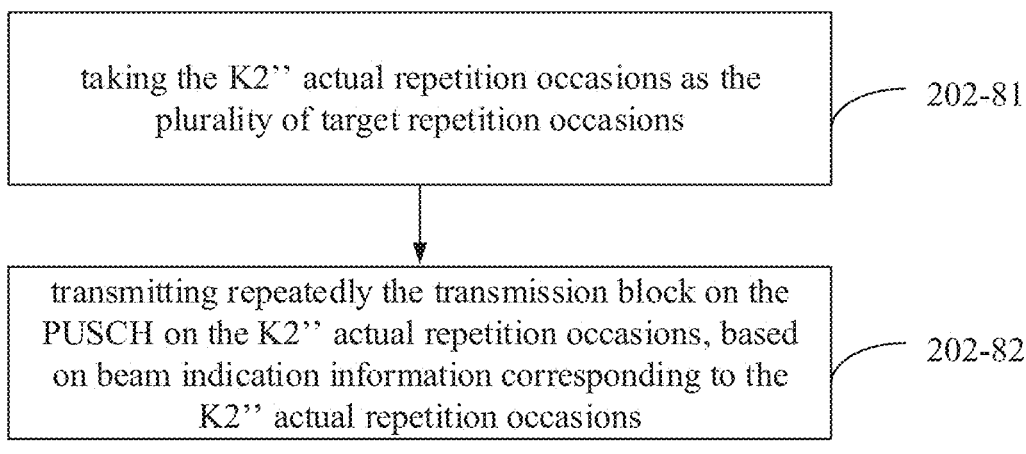

taking the K2'' actual repetition occasions as the plurality of target repetition occasions — 202-81 transmitting repeatedly the transmission block on the PUSCH on the K2'' actual repetition occasions, based on beam indication information corresponding to the K2'' actual repetition occasions — 202-82

FIG. 15

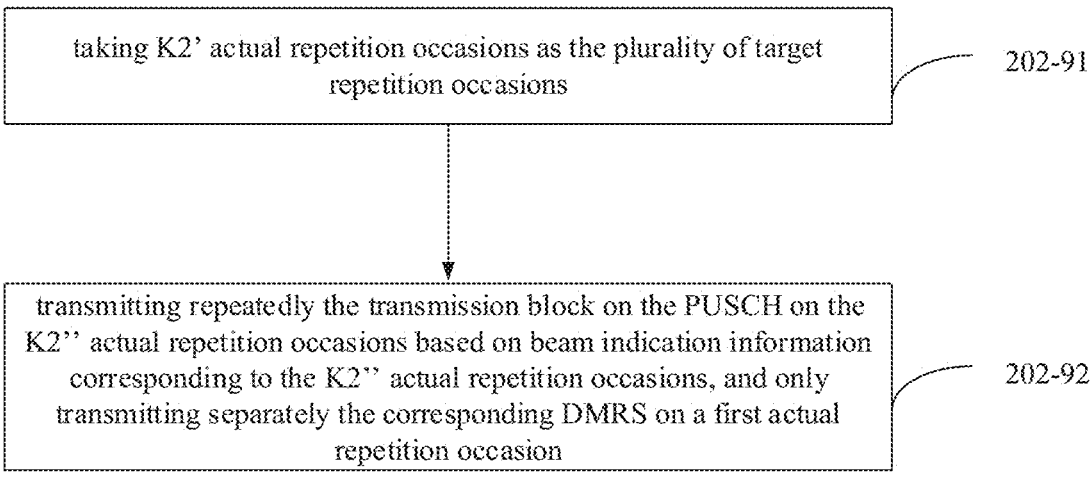

taking K2' actual repetition occasions as the plurality of target repetition occasions — 202-91 transmitting repeatedly the transmission block on the PUSCH on the K2'' actual repetition occasions based on beam indication information corresponding to the K2'' actual repetition occasions, and only transmitting separately the corresponding DMRS on a first actual repetition occasion — 202-92

FIG. 16

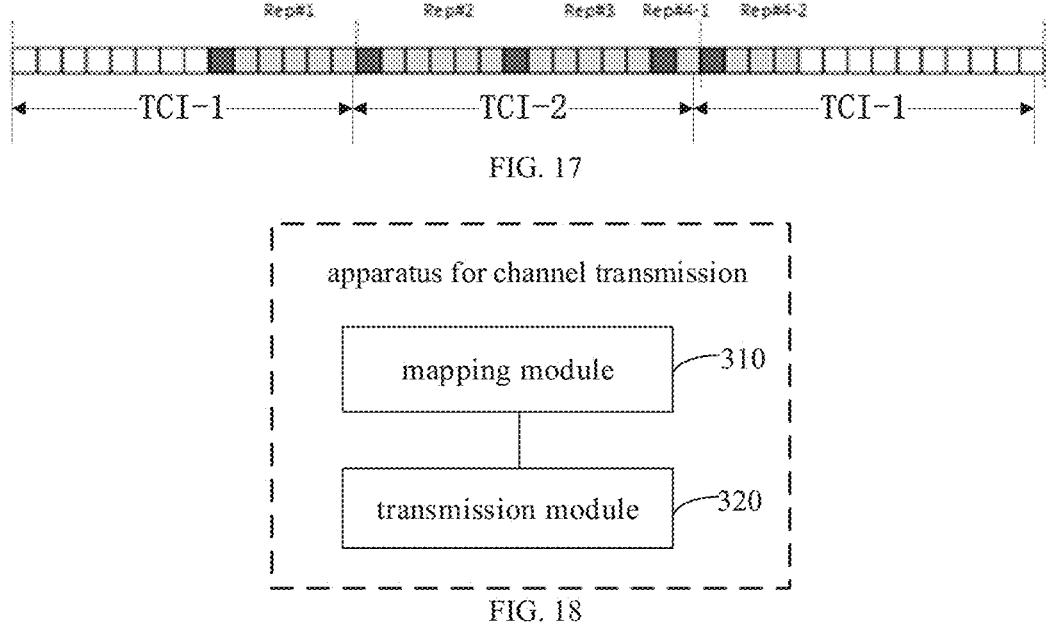

FIG. 17 apparatus for channel transmission mapping module — 310 transmission module — 320

FIG. 18

CHANNEL TRANSMISSION METHOD AND APPARATUS, AND STORAGE MEDIUM

CROSS-REFERENCE TO RELATED APPLICATION

This application is a US national phase of International Application No. PCT/CN2020/119604, filed on Sep. 30, 2020, the entire content of which is incorporated herein by reference.

TECHNICAL FIELD

The disclosure relates to the field of communications, and particularly to a method and an apparatus for channel transmission, and a storage medium.

BACKGROUND

To improve a coverage of a cell edge and provide a more balanced quality of service within a serving cell, multi-point collaboration is still an important technical means in a new radio (NR) system.

From a perspective of a network morphology, it is more conducive to providing a balanced user experience rate and significantly reduces a latency and a signaling overhead caused by handover to perform a network deployment in a centralized processing manner that combines a large number of distributed access points with a baseband. As frequency bands increases, from a perspective of ensuring a network coverage, a relatively dense access point deployment is also required. In a high-frequency band, with the improvement of integration of active antenna devices, a modular active antenna array is more likely to be adopted. An antenna array of each transmission and receiving point (TRP) may be divided into several relatively independent antenna panels, so that a shape and an interface number of the entire array surface may be flexibly adjusted with deployment scenarios and service requirements. The antenna panel or the TRP may also be connected by an optical fiber, to perform a more flexible distributed deployment. In a millimeter wave band, as a wavelength decreases, a blocking effect generated by obstacles such as a human body or a vehicle may be more significant. In this case, starting from a perspective of ensuring robustness of a link connection, collaboration among a plurality of TRPs or PANELs may also be used to transmit/receive a plurality of beams from a plurality of perspectives, thereby reducing an adverse effect caused by the blocking effect.

In a release 16 (R16) research stage, transmission enhancement is performed on a physical downlink data channel (PDSCH) based on an application of a multi-point cooperation transmission technology among downlink multi-TRPs or panels. Since data transmission includes a scheduling and a feedback of uplink and downlink channels, only downlink data channel enhancement may not ensure a service performance in a study of ultra-reliable and low latency communication (URLLC). Therefore, in a study of release 17 (R17), a physical downlink control channel (PDCCH), a physical uplink control channel (PUCCH), and a physical uplink shared channel (PUSCH) continue to be enhanced.

Taking the PUSCH for an example, the PUSCH may be repeatedly transmitted for enhancement, and a current PUSCH transmission mode for a single TRP is not applicable to a multi-TRP scenario.

SUMMARY

According to a first aspect of the disclosure, a method for channel transmission is provided and includes: mapping respectively, by a terminal based on a predetermined mapping mode different beam indication information to be received by corresponding different TRPs of a base station, to a plurality of candidate repetition occasions; in which the beam indication information is beam related information for transmission of a PUSCH; and transmitting repeatedly a transmission block on the PUSCH or only transmitting separately a corresponding demodulation reference signal (DMRS), on a plurality of target repetition occasions, based on beam indication information corresponding respectively to the plurality of target repetition occasions.

According to a second aspect of the disclosure, a computer-readable storage medium with a computer program stored thereon is provided. The computer program is configured to perform the method for channel transmission described in the first aspect.

According to a third aspect of the disclosure, a device for channel transmission is provided and includes: a processor; and a memory configured to store instructions executable by the processor; in which the processor is configured to perform the method for channel transmission described in the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 2 is a flowchart illustrating a channel transmission method according to some embodiments.

FIG. 3 is a diagram illustrating mapping from beam indication information to a repetition occasion according to some embodiments.

FIG. 4 is a flowchart illustrating another channel transmission method according to some embodiments.

FIG. 5 is a flowchart illustrating another channel transmission method according to some embodiments.

FIG. 6 is a diagram illustrating another mapping from beam indication information to a repetition occasion according to some embodiments.

FIG. 7 is a flowchart illustrating another channel transmission method according to some embodiments.

FIG. 8 is a diagram illustrating another mapping from beam indication information to a repetition occasion according to some embodiments.

FIG. 9 is a flowchart illustrating another channel transmission method according to some embodiments.

FIG. 10 is a flowchart illustrating another channel transmission method according to some embodiments.

FIG. 11 is a diagram illustrating another mapping from beam indication information to a repetition occasion according to some embodiments.

FIG. 12 is a flowchart illustrating another channel transmission method according to some embodiments.

FIG. 13 is a flowchart illustrating another channel transmission method according to some embodiments.

FIG. 14 is a diagram illustrating another mapping from beam indication information to a repetition occasion according to some embodiments.

FIG. 15 is a flowchart illustrating another channel transmission method according to some embodiments.

FIG. 16 is a flowchart illustrating another channel transmission method according to some embodiments.

FIG. 17 is a diagram illustrating another mapping from beam indication information to a repetition occasion according to some embodiments.

FIG. 18 is a block diagram illustrating an apparatus for channel transmission according to some embodiments.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims Terms used in the disclosure are merely for describing specific examples and are not intended to limit the disclosure. The singular forms "one", "the", and "this" used in the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in the disclosure to describe various information, the information is not limited to the terms. These terms are merely used to differentiate information of a same type. For example, without departing from the scope of the disclosure, first information is also referred to as second information, and similarly the second information is also referred to as the first information. Depending on the context, for example, the term "if" used herein may be explained as "when" or "while", or "in response to . . . , it is determined that".

Two PUSCH enhancement modes in R15 and R16 are introduced before a solution for channel transmission provided in the disclosure is introduced.

A first enhancement mode is a repetition type A transmission mode adopted in R15.

Figure 1A:
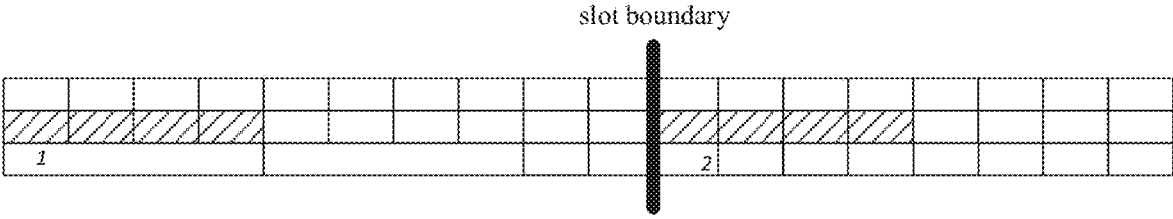
FIGS. 1A to ID are diagrams illustrating a PUSCH repetition transmission mode according to some embodiments.

The repetition type A transmission mode is a slot aggregation PUSCH transmission mode at a slot level. For example, as illustrated in FIG. 1A, a PUSCH is repeatedly transmitted on continuous K nominal repetition occasions and a value of K in FIG. 1A is 2. Transmission starts from an $S^{th}$ symbol of a start slot, each repetition occasion lasts L symbols, and a value of L in FIG. 1A is 4.

It is to be noted that (S+L) does not exceed a slot boundary. For example, when a slot includes 14 time symbols, (S+L) does not exceed 14.

The repetition type A transmission mode is not suitable for services with a low latency requirement and a high reliability requirement.

A second enhancement mode is a repetition type B transmission mode adopted in R16.

In order to be suitable for services with a low latency requirement and a high reliability requirement, a PUSCH repetition transmission mode in unit of a mini-slot is proposed in R16, that is, the repetition type B transmission mode, and a PUSCH repetition transmission is allowed to be performed cross a slot, thereby further reducing a latency.

Figure 1B:
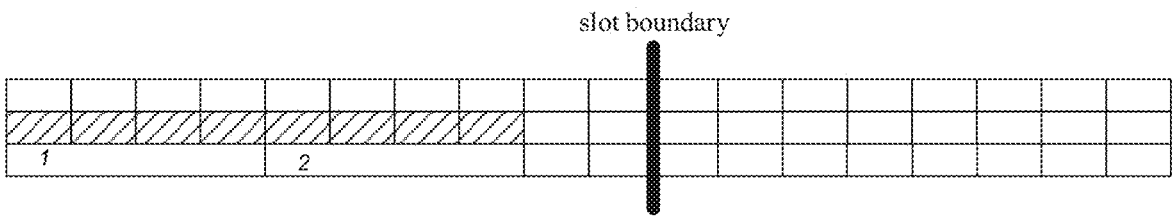

A PUSCH starts transmission on an $S^{th}$ symbol of a start slot on a time domain, K repetition occasions are continuously sent, and each repetition occasion continuously occupies L symbols, as illustrated in FIG. 1B.

At the same time, in the repetition type B transmission mode, (S+L) may cross the slot boundary. When a cross-slot boundary appears at a repetition occasion, the repetition occasion is redivided, to obtain correspondingly $K^{th}$ actual repetition occasions. For example, as illustrated in FIG. 1C and FIG. 1D.

Figure 1C:
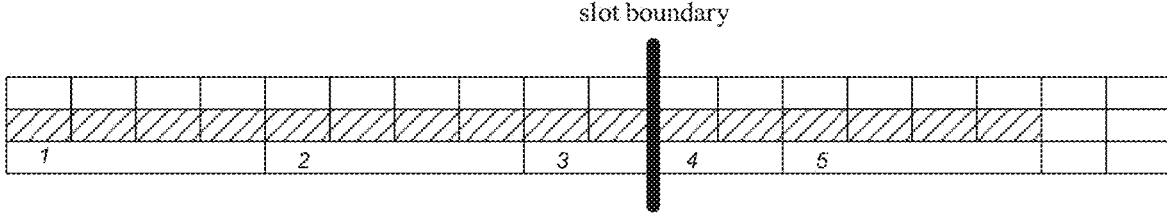

In FIG. 1C, a third repetition occasion is redivided into two actual repetition occasions by the slot boundary since it crosses the slot boundary, that is, in FIG. 1C, K of the repetition occasions of the PUSCH is 4. However, K' of the actual repetition occasions is 5.

Figure 1D:
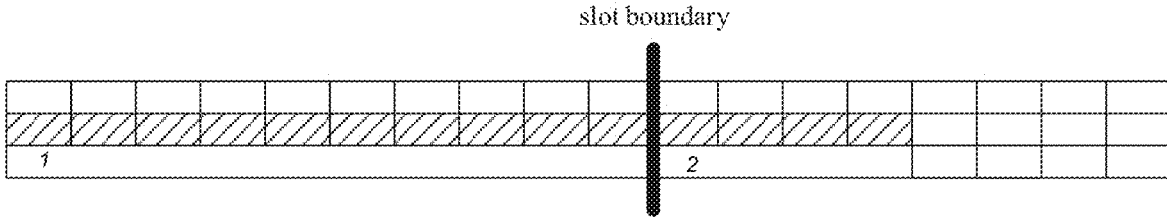

In FIG. 1D, there is only one repetition occasion. The repetition occasion is redivided into two actual repetition occasions by the slot boundary since it crosses the slot boundary, that is, in FIG. 1D, K of the repetition occasion of the PUSCH is 1. However, K' of the actual repetition occasions is 2.

The base station may indicate that a semi-static flexible time symbol is a dynamic uplink symbol or a dynamic downlink symbol by a slot format indicator (SFI). Therefore, the semi-static flexible time symbol may be available for the PUSCH (that is, the flexible time symbol is an uplink signal available for PUSCH transmission) or may be unavailable (that is, the flexible time symbol is a downlink signal unavailable for PUSCH transmission). When there is an unavailable time symbol, the unavailable time symbol needs to be dropped and the PUSCH is transmitted on a remaining available symbol. That is, for the whole transmission, a slot L×K may represent a time window size of PUSCH transmission. When uplink transmission is unable to be performed on a certain time symbol of the time window, the PUSCH is unable to be transmitted on the time symbol, the repetition occasion needs to be dropped, and the PUSCH is transmitted on other repetition occasions.

The values corresponding to the repetition type A transmission mode and the repetition type B transmission mode are as illustrated in Table 1:

TABLE 1

| Repetition Transmission Mode of PUSCH | Basic Cyclic Prefix | | | Extended Cyclic Prefix | | |
|---|---|---|---|---|---|---|
| | Start Time Symbol S of Start Slot | Duration L of Each Repetition Occasion | S + L | Start Time Symbol S of Start Slot | Duration L of Each Repetition Occasion | S + L |
| Repetition Type A Transmission Mode | 0 | $\{4, \ldots, 14\}$ | $\{4, \ldots, 14\}$ | 0 | $\{4, \ldots, 12\}$ | $\{4, \ldots, 12\}$ |
| Repetition Type B Transmission Mode | $\{0, \ldots, 13\}$ | $\{1, \ldots, 14\}$ | Type A $\{1, \ldots, 14\}$ Type B $\{1, \ldots, 27\}$ | $\{0, \ldots, 11\}$ | $\{1, \ldots, 12\}$ | Type A $\{1, \ldots, 12\}$ Type B $\{1, \ldots, 23\}$ |

The repetition type A transmission mode and the repetition type B transmission mode are applicable to a single RTP scenario and do not support a terminal to repeatedly transmit the PUSCH by using a multi-TRP technology to improve the reliability of data transmission.

In order to solve the above problems, a solution for channel transmission is provided in the disclosure and the PUSCH may be repeatedly transmitted based on a multi-TRP scenario, which improves the reliability of data transmission.

A method for channel transmission is provided in embodiments of the disclosure and applicable to a terminal. As illustrated in FIG. 2, FIG. 2 is a flowchart illustrating a method for channel transmission according to some embodiments. The method may include the following steps.

At step 201, the terminal maps respectively, based on a predetermined mapping mode, different beam indication information to be received by corresponding different TRPs of a base station, to a plurality of candidate repetition occasions.

In embodiments of the disclosure, the beam indication information is beam related information for transmission of the PUSCH. The beam indication information may include spatial relation info or uplink (UL) transmission configuration indicator (TCI) state information.

At step 202, a transmission block on the PUSCH is transmitted repeatedly or a corresponding DMRS is only transmitted separately, on a plurality of target repetition occasions, based on beam indication information corresponding respectively to the plurality of target repetition occasions.

In the above embodiments, the terminal may map respectively, based on the predetermined mapping mode, the beam indication information to be received by the corresponding different TRPs of the base station, to the plurality of candidate repetition occasions. Further, the transmission block is transmitted repeatedly on the PUSCH or the corresponding DMRS is only transmitted separately, on the plurality of target repetition occasions, based on the beam indication information corresponding respectively to the plurality of target repetition occasions. The PUSCH may be enhanced in a multi-TRP scenario, which improves the reliability of data transmission.

In an optional embodiment, corresponding to the above repetition type A transmission mode, the step 201 may map the different beam indication information to the plurality of candidate repetition occasions in the following mode.

In a first mode, the terminal maps respectively based on the predetermined mapping mode, the different beam indication information to K1 nominal repetition occasions.

The K1 nominal repetition occasions are correspondingly located within different slots, start symbol positions of the K1 nominal repetition occasions within the slots are same, and a number of continuous symbols in each of the slots is same.

That is, when the PUSCH is enhanced by using the repetition type A transmission mode, the different beam indication information may be mapped respectively to the K1 nominal repetition occasions. For example, different TCIs are mapped respectively to four nominal repetition occasions Rep #1 to Rep #4, TCI-1 and TCI-2 are different beam indication information.

Corresponding to the mode, when there is a first repetition occasion at which the transmission of the PUSCH is unable to be performed in the K1 nominal repetition occasions, as illustrated in FIG. 4, FIG. 4 is a flowchart illustrating another method for channel transmission according to some embodiments as illustrated in FIG. 2 and step 202 may include the following steps.

At step 202-11, a plurality of second repetition occasions in the K1 nominal repetition occasions are taken as the plurality of target repetition occasions in response to determining that there is a first repetition occasion in the K1 nominal repetition occasions.

In embodiments of the disclosure, the first repetition occasion is a repetition occasion at which the transmission of the PUSCH is unable to be performed in the K1 nominal repetition occasions, and the plurality of second repetition occasions are a plurality of repetition occasions at which the transmission of the PUSCH is able to be performed in the K1 nominal repetition occasions.

The first repetition occasion may refer to a repletion occasion at which a certain symbol is configured as a downlink symbol due to resource allocation, or the first actual repetition occasion may further refer to a repetition occasion at which the transmission of the PUSCH is unable to be performed caused due to other situations, in the repetition A transmission mode. The plurality of second repetition occasions are a plurality of repetition occasions at which there is no symbol configuration conflict in the K1 nominal repetition occasions in the repetition A transmission mode.

In embodiments of the disclosure, the plurality of second repetition occasions may be taken as the plurality of target repetition occasions in response to there being the first repetition occasion in the K1 nominal repetition occasions.

At step 202-12, the transmission block on the PUSCH is transmitted repeatedly on the plurality of second repetition occasions, based on beam indication information corresponding respectively to the plurality of second repetition occasions.

In embodiments of the disclosure, the transmission block on the PUSCH may be transmitted repeatedly on the plurality of second repetition occasions, after determining the beam related information which at least includes the beam direction based on the beam indication information corresponding respectively to the plurality of second repetition occasions.

For example, when a third nominal repetition occasion is the first repetition occasion at which the transmission of the PUSCH is unable to be performed, the terminal may transmit repeatedly the transmission block on the PUSCH on the first, second and fourth repetition occasions based on the corresponding beam indication information.

In the above embodiments, when there is the first repetition occasion at which the transmission of the PUSCH is unable to be performed in the K1 nominal repetition occasions, the terminal may transmit repeatedly the transmission block on the PUSCH on the plurality of second repetition occasions in addition to the first repetition occasion, which enhances the PUSCH in a multi-TRP scenario and improves the reliability of data transmission.

Or, corresponding to the above first mode, as illustrated in FIG. 5, FIG. 5 is a flowchart illustrating another method for channel transmission according to some embodiments as illustrated in FIG. 2. Step 202 may include following steps.

At step 202-21, the K1 nominal repetition occasions are taken as the plurality of target repetition occasions in response to determining that there is a first repetition occasion in the K1 nominal repetition occasions.

In embodiments of the disclosure, the terminal may still take all K1 nominal repetition occasions as the plurality of target repetition occasions in response to there being the first repetition occasion at which the transmission of the PUSCH is unable to be performed in the K1 nominal repetition occasions.

At step 202-22, the transmission block on the PUSCH is transmitted repeatedly on the plurality of second repetition occasions based on beam indication information corresponding to the plurality of second repetition occasions, and the corresponding DMRS is only transmitted separately on the first repetition occasion.

In embodiments of the disclosure, the terminal may transmit repeatedly the transmission block on the PUSCH on the plurality of second repetition occasions, and only transmit separately the corresponding DMRS on the first repetition occasion, so that the base station may perform channel estimation better based on the DMRS.

Similarly, as illustrated in FIG. 3, the transmission block on the PUSCH may be transmitted repeatedly on first, the second and fourth repetition occasions, and the DMRS may be transmitted on the third repetition occasion.

In the above embodiments, when there is the first repetition occasion at which the transmission of the PUSCH is unable to be performed in the K1 nominal repetition occasions, the DMRS may be only transmitted separately on the first repetition occasion, and the transmission block on the PUSCH may be transmitted repeatedly on the plurality of second repetition occasions in addition to the first repetition occasion. Similarly, the PUSCH may be enhanced in a multi-TRP scenario, which improves the reliability of data transmission and enhances the channel estimation quality.

In an optional embodiment, a process of only transmitting separately the corresponding DMRS through a first symbol on the first repetition occasion may adopt the following solutions.

In an example, the corresponding DMRS may be only transmitted separately on the first target repetition occasion, based on the beam indication information mapped to the first target repetition occasion.

In embodiments of the disclosure, since different beam indication information are mapped to the K1 nominal repetition occasions, there is corresponding beam indication information on the first repetition occasion, in which case, the corresponding DMRS may be only transmitted separately on the first target repetition occasion, directly based on the beam indication information mapped to the first target repetition occasion.

In another example, the corresponding DMRS is only transmitted separately on the first target repetition occasion, after determining the beam indication information corresponding to the first repetition occasion based on beam indication information corresponding to a third repetition occasion.

In embodiments of the disclosure, the third repetition occasion is a repetition occasion adjacent to the first repetition occasion in the K1 nominal repetition occasions. The third repetition occasion may be a repetition occasion before or after the first repetition occasion. The beam indication information corresponding to the first repetition occasion may be same as or different from the beam indication information corresponding to the third repetition occasion, which will not be limited in the disclosure.

The corresponding DMRS is only transmitted separately on the first target repetition occasion based on the beam indication information corresponding to the first repetition occasion, after determining the beam indication information corresponding to the first repetition occasion based on the beam indication information corresponding to the third repetition occasion.

In the above embodiments, the corresponding DMRS may be only transmitted separately on the first actual repetition occasion at which the transmission of the PUSCH is unable to be performed, which improves the channel estimation quality, with high availability.

In an optional embodiment, corresponding to the above repetition type A transmission mode, the step 201 may further map the different beam indication information to the plurality of candidate repetition occasions in the following mode.

In a second mode, the terminal maps respectively based on the predetermined mapping mode, the different beam indication information to K1' actual repetition occasions.

In embodiments, the K1' actual repetition occasions are repetition occasions at which the transmission of the PUSCH is able to be performed in K1 nominal repetition occasions, the K1 nominal repetition occasions are located respectively within different slots, start symbol positions of the K1 nominal repetition occasions within the slots are same, and a number of continuous symbols in each of the slots is same.

The first, second and fourth repetition occasions in FIG. 3 may be taken as K1' actual repetition occasions, and the mapping mode may be as illustrated in FIG. 6.

Corresponding to the above second mode, as illustrated in FIG. 7, FIG. 7 is a flowchart illustrating another method for channel transmission according to some embodiments as illustrated in FIG. 2 and step 202 may include following steps.

At step 202-31, the K1' actual repetition occasions are taken as the plurality of target repetition occasions.

In embodiments of the disclosure, the K1' actual repetition occasions may be directly taken as the plurality of target repetition occasions.

At step 202-31, the transmission block on the PUSCH is transmitted repeatedly on the K1' actual repetition occasions, based on beam indication information corresponding to the K1' actual repetition occasions.

In embodiments of the disclosure, different beam indication directions may be directly mapped to the K1' actual repetition occasions, and the K1' actual repetition occasions may be taken as the plurality of target repetition occasions at which the transmission block on the PUSCH is transmitted repeatedly. The PUSCH may be enhanced in a multi-TRP scenario, which improves the reliability of data transmission.

In an optional embodiment, corresponding to the above repetition type B transmission mode, the step 201 may map the different beam indication information to the plurality of candidate repetition occasions in the following mode.

In a third mode, the terminal maps respectively based on the predetermined mapping mode, the different beam indication information to K2 nominal repetition occasions.

The K2 nominal repetition occasions are back-to-back continuously allocated, and the mapping mode is as illustrated in FIG. 8.

Corresponding to the above third mode, as illustrated in FIG. 9, FIG. 9 is a flowchart illustrating another method for channel transmission according to some embodiments as illustrated in FIG. 2 and step 202 may include the following steps.

At step 202-41, a plurality of second actual repetition occasions are taken as the plurality of target repetition occasions, in response to the K2 nominal repetition occasions being divided into K2' actual repetition occasions and there being a first actual repetition occasion in the K2' actual repetition occasions.

In embodiments of the disclosure, since the K2 nominal repetition occasions may cross a slot, there may be K2' actual repetition occasions divided by a slot boundary. Or, a certain nominal repetition occasion which includes a downlink symbol is divided into two actual repetition occasions. For example, when a d$^{th}$ symbol in an m$^{th}$ nominal repetition occasion in the K2 nominal repetition occasions is configured as a downlink symbol, symbol(s) before the d$^{th}$ symbol belongs to an actual repetition occasion, and symbol(s) after the d$^{th}$ symbol belongs to another actual repetition occasion.

The first actual repetition occasion is a repetition occasion at which the transmission of the PUSCH is unable to be performed in the K2' actual repetition occasions, and the plurality of second actual repetition occasions are a plurality of repetition occasions at which the transmission of the PUSCH is able to be performed in the K2' actual repetition occasions.

It should be noted that, the first actual repetition occasion may refer to a repetition occasion at which the transmission of the PUSCH is unable to be performed since any symbol is configured as a downlink symbol in the K2' actual repetition occasions. Or, the first actual repetition occasion may refer to a repetition occasion at which decoding fails even if a base station side receives information transmitted at the repetition occasion due to an overhigh effective encoding rate caused by a too small number of symbols included and caused by a being divided (by a slot or a downlink symbol) in the K2' actual repetition occasions. Or, the first actual repetition occasion may further refer to a repetition occasion at which the transmission of the PUSCH is unable to be performed due to other situations. And the plurality of second actual repetition occasions are a plurality of repetition occasions at which the transmission of the PUSCH is able to be performed.

In embodiments of the disclosure, the plurality of second actual repetition occasions may be taken as the plurality of target repetition occasions.

At step 202-42, the transmission block on the PUSCH is transmitted repeatedly on the plurality of second actual repetition occasions, based on beam indication information corresponding to the plurality of second actual repetition occasions.

For example, as illustrated in FIG. 8, when Rep #4-1 belongs to the first actual repetition occasion at which the transmission of the PUSCH is unable to be performed, the terminal may transmit repeatedly the transmission block on the PUSCH respectively based on beam indication information TCI-1, TCI-2, TCI-1, TCI-2 on Rep #1, Rep #2, Rep #3, Rep #4-2.

In the above embodiments, when there is the first actual repetition occasion at which the transmission of the PUSCH is unable to be performed in the K2' actual repetition occasions, the transmission block on the PUSCH may only be transmitted repeatedly on the plurality of second actual repetition occasions. The PUSCH may be enhanced in a multi-TRP scenario, which improves the reliability of data transmission.

Or, corresponding to the above third mode, as illustrated in FIG. 10, FIG. 10 is a flowchart illustrating another method for channel transmission according to some embodiments as illustrated in FIG. 2 and step 202 may include the following steps.

At step 202-51, K2' actual repetition occasions are taken as the plurality of target repetition occasions, in response to the K2 nominal repetition occasions being divided into the K2' actual repetition occasions and there being a first actual repetition occasion in the K2' actual repetition occasions.

In embodiments of the disclosure, the K2' actual repetition occasions may still be taken as the plurality of target repetition occasions in response to the K2 nominal repetition occasions being divided into the K2' actual repetition occasions and there being the first actual repetition occasion at which the transmission of the PUSCH is unable to be performed in the K2' actual repetition occasions.

At step 202-52, the transmission block on the PUSCH is transmitted repeatedly on a plurality of second actual repetition occasions based on beam indication information corresponding to the plurality of second actual repetition occasions, and the corresponding DMRS is only transmitted separately on the first actual repetition occasion.

In embodiments of the disclosure, the plurality of second actual repetition occasions are a plurality of repetition occasions at which the transmission of the PUSCH is able to be performed in the K2' actual repetition occasions.

Similarly, as illustrated in FIG. 8, the terminal may transmit repeatedly the transmission block on the PUSCH based on the corresponding beam indication information on Rep #1, Rep #2, Rep #3, Rep #4-2, and only transmit separately the corresponding DMRS on Rep #4-1.

In the above embodiments, the transmission block on the PUSCH may be transmitted repeatedly on the plurality of second actual repetition occasions, and the corresponding DMRS may be only transmitted separately on the first actual repetition occasion, thereby enhancing the PUSCH in a multi-TRP scenario, which improves the reliability of data transmission and enhances the channel estimation quality.

In an optional embodiment, corresponding to the above repetition type B transmission mode, the step 201 may map the different beam indication information to the plurality of candidate repetition occasions in the following mode.

In a fourth mode, the terminal maps respectively based on the predetermined mapping mode, the different beam indication information to K2' actual repetition occasions.

The K2' actual repetition occasions are actual repetition occasions obtained by dividing the K2 nominal repetition occasions, and the K2 nominal repetition occasions are back-to-back continuously allocated. The mapping mode is as illustrated in FIG. 11.

Corresponding to the above fourth mode, as illustrated in FIG. 12, FIG. 12 is a flowchart illustrating another method for channel transmission according to some embodiments as illustrated in FIG. 2 and step 202 may include following steps.

At step 202-61, a plurality of second actual repetition occasions are taken as the plurality of target repetition occasions, in response to determining that there is a first actual repetition occasion in the K2' actual repetition occasions.

In embodiments of the disclosure, the first actual repetition occasion is a repetition occasion at which the transmission of the PUSCH is unable to be performed in the K2' actual repetition occasions, and the plurality of second actual repetition occasions are a plurality of repetition occasions at which the transmission of the PUSCH is able to be performed in the K2' actual repetition occasions. In embodiments of the disclosure, the plurality of second actual repetition occasions may be directly taken as the plurality of target repetition occasions.

At step 202-62, the transmission block is transmitted repeatedly on the PUSCH on the plurality of second actual repetition occasions, based on beam indication information corresponding to the plurality of second actual repetition occasions.

For example, as illustrated in FIG. 11, the terminal may transmit repeatedly the transmission block on the PUSCH respectively based on the beam indication information TCI-1, TCI-2, TCI–1, TCI-1 on Rep #1, Rep #2, Rep #3, Rep #4-2.

In the above embodiments, when the different beam indication information is mapped to the K2' actual repetition occasions, the transmission block on the PUSCH may be transmitted repeatedly on the plurality of second actual repetition occasions at which the transmission is able to be performed, in response to determining that there is the first actual repetition occasion at which the transmission of the PUSCH is unable to be performed in the K2' actual repetition occasions. The PUSCH may be enhanced in a multi-TRP scenario, which improves the reliability of data transmission.

Corresponding to the above fourth mode, as illustrated in FIG. 13, FIG. 13 is a flowchart illustrating another method for channel transmission according to some embodiments as illustrated in FIG. 2 and step 202 may include the following steps.

At step 202-71, the K2' actual repetition occasions are taken as the plurality of target repetition occasions, in response to determining that there is a first actual repetition occasion in the K2' actual repetition occasions.

In embodiments of the disclosure, even if there is the first actual repetition occasion at which the transmission of the PUSCH is unable to be performed in the K2' actual repetition occasions, the K2' actual repetition occasions may be taken as the plurality of target repetition occasions.

At step 202-72, the transmission block on the PUSCH is transmitted repeatedly on a plurality of second actual repetition occasions based on beam indication information corresponding to the plurality of second actual repetition occasions, and the corresponding DMRS is only transmitted separately on the first actual repetition occasion.

The plurality of second actual repetition occasions are a plurality of repetition occasions at which the transmission of the PUSCH is able to be performed in the K2' actual repetition occasions.

For example, as illustrated in FIG. 11, the terminal may transmit repeatedly the transmission block on the PUSCH based on the beam indication information TCI-1, TCI-2, TCI-1, TCI-1 on Rep #1, Rep #2, Rep #3, Rep #4-2, and only transmit separately the corresponding DMRS on Rep #4-1.

In the above embodiments, the PUSCH may be enhanced in a multi-TRP scenario, which improves the reliability of data transmission and enhances the channel estimation quality.

In an optional embodiment, corresponding to the above repetition type B transmission mode, the step 201 may map the different beam indication information to the plurality of candidate repetition occasions in the following mode.

In a fifth mode, the terminal maps respectively based on the mapping mode, the different beam indication information to K2" actual repetition occasions.

The K2" actual repetition occasions are repetition occasions at which the transmission of the PUSCH is able to be performed in K2' actual repetition occasions; the K2' actual repetition occasions are actual repetition occasions obtained by dividing K2 nominal repetition occasions; and the K2 nominal repetition occasions are back-to-back continuously allocated. The mapping mode is as illustrated in FIG. 14.

Corresponding to the fifth mode, as illustrated in FIG. 15, FIG. 15 is a flowchart illustrating another method for channel transmission according to some embodiments as illustrated in FIG. 2 and step 202 may include following steps.

At step 202-81, the K2" actual repetition occasions are taken as the plurality of target repetition occasions.

At step 202-82, the transmission block on the PUSCH is transmitted repeatedly on the K2" actual repetition occasions, based on beam indication information corresponding to the K2" actual repetition occasions.

For example, as illustrated in FIG. 14, the terminal transmits repeatedly the transmission block on the PUSCH based on the beam indication information TCI-1, TCI-2, TCI-1, TCI-2 on Rep #1, Rep #2, Rep #3, Rep #4-2.

In the above embodiments, the PUSCH may be enhanced in a multi-TRP scenario, which improves the reliability of data transmission.

Or, corresponding to the fifth mode, as illustrated in FIG. 16, FIG. 16 is a flowchart illustrating another method for channel transmission according to some embodiments as illustrated in FIG. 2 and step 202 may include the following steps.

At step 202-91, the K2' actual repetition occasions are taken as the plurality of target repetition occasions.

At step 202-92, the transmission block on the PUSCH is transmitted repeatedly on the K2" actual repetition occasions based on beam indication information corresponding to the K2" second actual repetition occasions, and the corresponding DMRS is only transmitted separately on the first actual repetition occasion.

For example, as illustrated in FIG. 14, the terminal transmits repeatedly the transmission block on the PUSCH based on the beam indication information TCI-1, TCI-2, TCI-1, TCI-2 on Rep #1, Rep #2, Rep #3, Rep #4-2, and only transmits separately the corresponding DMRS on Rep #4-1.

In the above embodiments, the PUSCH may be enhanced in a multi-TRP scenario, which improves the reliability of data transmission, and enhances the channel estimation quality.

In an optional embodiment, in the third, fourth and fifth modes, the following solution may be adopted for a process of only transmitting separately the corresponding DMRS on the first actual repetition occasion.

In an example, the corresponding DMRS may be only transmitted separately on the first actual repetition occasion, based on the beam indication information mapped to the first actual repetition occasion.

When there is corresponding beam indication information on the first actual repetition occasion, the corresponding DMRS is only transmitted separately on the first actual repetition occasion directly based on the beam indication information mapped to the first actual repetition occasion.

In another example, the corresponding DMRS is only transmitted separately on the first target repetition occasion, after determining the beam indication information corresponding to the first actual repetition occasion based on beam indication information corresponding to a third actual repetition occasion.

The third actual repetition occasion is an actual repetition occasion adjacent to the first actual repetition occasion in the K2' nominal repetition occasions. For example, the third actual repetition occasion may be a previous repetition occasion or a latter repetition occasion of the first actual repetition occasion. The beam indication information corresponding to the first actual repetition occasion may be same as or different from the beam indication information corresponding to the third actual repetition occasion.

In the above embodiments, the corresponding DMRS may be only transmitted separately on the first actual repetition occasion at which the transmission of the PUSCH is unable to be performed, which improves the channel estimation quality, with high availability.

In an optional embodiment, the mapping mode may be configured by the base station through a first signaling, and the first signaling may include but not limited to a high-layer radio resource control (RRC) signaling or a media access control address (MAC) signaling.

In another example, the base station may configure association information corresponding to the mapping mode through a second signaling. The second signaling may be same as or different from the first signaling.

In another example, the mapping mode may be directly configured in a protocol.

Specifically, step 201 may include any one of the following modes.

In a first mode, the different beam indication information is cyclically mapped to the plurality of candidate repetition occasions based on a preset sequence.

The terminal cyclically maps the different beam indication information to K1 nominal repetition occasions based on the mapping mode. In this case, the obtained mapping result is as illustrated in FIG. 3. When there is a first repetition occasion, the terminal may transmit repeatedly a data block on the PUSCH respectively based on the information indicated by TCI-1, TCI-2, TCI-2 on Rep #1, Rep #2, Rep #4.

Or, the terminal cyclically maps the different beam indication information to K1' nominal repetition occasions based on the mapping mode, to obtain a mapping result as illustrated in FIG. 6. The terminal may transmit repeatedly the transmission block on the PUSCH respectively based on the beam indication information TCI-1, TCI-2, TCI-1 on Rep #1, Rep #2, Rep #4.

In a second mode, the different beam indication information is mapped to the plurality of candidate repetition occasions based on a preset sequence after repeating the different beam indication information a specified number of times.

For example, when the specific number of times is 2, TCI1 may be repeated twice, TC2 may be repeated twice, and then mapped, and the terminal may transmit repeatedly a data block on the PUSCH respectively based on the information indicated by TCI-1, TCI-1, TCI-2, TCI-2 on Rep #1, Rep #2, Rep #3, Rep #4.

When there is a first repetition occasion in the K1 nominal repetition occasions, processing may be performed referring to a cyclic mapping mode in the first mode, which will not be repeated herein.

In a third mode, the different beam indication information is averagely mapped to the plurality of candidate repetition occasions based on a preset number of PUSCH repetitions.

For example, when the preset number of PUSCH repetitions is 8, the terminal may transmit repeatedly the transmission block on the PUSCH based on the information indicated by TCI-1 on previous four repetition occasions. The PUSCH may be transmitted repeatedly based on the information indicated by TCI-1 on the latter four repetition occasions.

When there is a first repetition occasion in the K1 nominal repetition occasions, processing may be performed referring to a cyclic mapping mode in the first mode, which will not be repeated herein.

In a fourth mode, the different beam indication information is mapped to the plurality of candidate repetition occasions based on a preset sequence, after determining a mapping sequence corresponding to the different beam indication information, indicated by association information based on a predetermined corresponding relationship between the association information and the different beam indication information.

In an example, association information may be identified by a bitmap.

For example, when K1=4, the association information includes 1001, and it is assumed that the above corresponding relationship is that 1 corresponding to TCI2, and 0 corresponding to TCI1, the association sequence is TCI2, TCI1, TCI1, TCI2. The terminal may transmit repeatedly the transmission block on the PUSCH respectively based on the information indicated by TCI-2, TCI-1, TCI-1, TCI-2 on Rep #1, Rep #2, Rep #3, Rep #4.

When there is a first repetition occasion in the K1 nominal repetition occasions, processing may be performed referring to a cyclic mapping mode in the first mode, which will not be repeated herein.

The first mode to the fourth mode are applicable to the repetition Type B transmission mode, which will not be repeated herein.

In some embodiments, the step 201 may further include.

In a fifth mode, the terminal maps respectively the different beam indication information to all target repetition occasions included on a plurality of slots sequentially arranged based on the predetermined mapping mode.

In the mode, mapping is performed based on a slot, without distinguishing a repetition occasion. Assume that the mapping mode is as illustrated in FIG. 17 for the repetition type B transmission mode, the terminal may transmit repeatedly the transmission block on the PUSCH respectively based on the information indicated by TCI-1, TCI-2, TCI-2, TCI-1 on Rep #1, Rep #2, Rep #3, Rep #4-2.

In the above embodiments, the PUSCH may be enhanced in a multi-TRP scenario, which improves the reliability of data transmission.

The disclosure further provides embodiments of the apparatus for achieving an application function corresponding to the embodiments of the method for achieving an application function.

As illustrated in FIG. 18, FIG. 18 is a block diagram illustrating an apparatus for channel transmission according to some embodiments. The apparatus includes a mapping module 310 and a transmission module 320.

The mapping module 310 is configured to map respectively, by a terminal based on a predetermined mapping mode, different beam indication information to be received by corresponding different TRPs of a base station, to a plurality of candidate repetition occasions; in which the beam indication information is beam related information for transmission of a PUSCH.

The transmission module 320 is configured to transmit repeatedly a transmission block on the PUSCH or only transmit separately a corresponding DMRS, on a plurality of target repetition occasions, based on beam indication information corresponding respectively to the plurality of target repetition occasions.

The embodiments of the apparatus refer to part descriptions of the embodiments of the method since they correspond to the embodiments of the method. The embodiments of the apparatus described above are only schematic, in which the above units described as separate parts may or may not be physically separated, and the parts shown as units may or may not be physical units, which may be located in one place or may be distributed to multiple network units. Some or all modules may be selected according to the actual requirements to achieve the purpose of the disclosure. Those skilled in the art may understand and implement it without any creative effort.

Accordingly, a computer-readable storage medium with a computer program stored thereon is provided in the disclosure. The computer program is configured to perform any one of the above methods for channel transmission.

Accordingly, a device for channel transmission is further provided in the disclosure and includes: a processor; and a memory configured to store instructions executable by the processor; in which the processor is configured to any one of the above methods for channel transmission.

Figure 19:
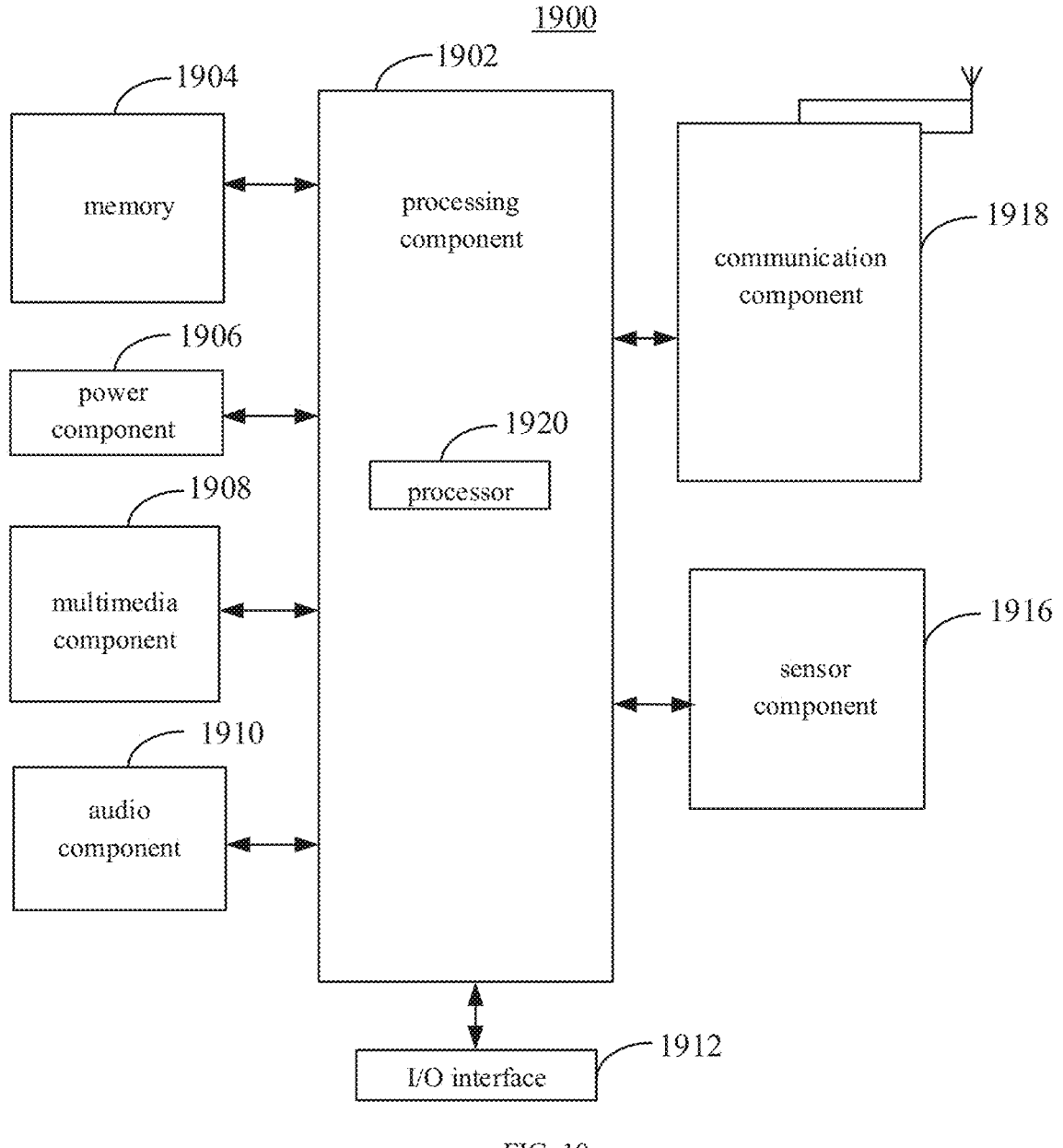
FIG. 19 is a diagram illustrating a structure of a device for channel transmission according to some embodiments.

FIG. 19 is a block diagram illustrating an electronic device 1900 according to some embodiments. For example, the electronic device 1900 may be a terminal such as a smart phone, a tablet, an e-book reader, a multimedia playback device, a wearable device, a vehicle-mounted terminal, an iPad, and a smart TV.

As illustrated in FIG. 19, the electronic device 1900 may include one or more components: a processing component 1902, a memory 1904, a power component 1906, a multimedia component 1908, an audio component 1910, an input/output (I/O) interface 1912, a sensor component 1916, and a communication component 1918.

The processing component 1902 typically controls overall operations of the device 1900, such as the operations associated with display, telephone calls, data communications, camera operations, and recording operations. The processing component 1902 may include one or more processors 1920 to execute instructions to perform all or part of the steps in the above described methods for channel transmission. Moreover, the processing component 1902 may include one or more modules which facilitate the interaction between the processing component 1902 and other components. For instance, the processing component 1902 may include a multimedia module to facilitate the interaction between the multimedia component 1908 and the processing component 1902. For another example, the processing component 1902 may read executable instructions from the memory, to implement steps of the methods for channel transmission provided in the above various embodiments.

The memory 1904 is configured to store various types of data to support the operation of the device 1900. Examples of such data include instructions for any applications or methods operated on the device 1900, contact data, phonebook data, messages, pictures, video, etc. The memory 1904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1906 provides power to various components of the device 1900. The power component 1906 may include a power management system, one or more power sources, and any other components associated with the generation, management, and distribution of power in the device 1900.

The multimedia component 1908 includes a screen providing an output interface between the device 1900 and the user. In some embodiments, the multimedia component 1908 includes a front camera and/or a rear camera. The front camera and the rear camera may receive an external multimedia datum while the device 1900 is in an operation mode, such as a photographing mode or a video mode. Each of the front camera and the rear camera may be a fixed optical lens system or have focus and optical zoom capability.

The audio component 1910 is configured to output and/or input audio signals. For example, the audio component 1910 includes a microphone ("MIC") configured to receive an external audio signal when the device 1900 is in an operation mode, such as a call mode, a recording mode, and a voice recognition mode. The received audio signal may be further stored in the memory 1904 or transmitted via the communication component 1916. In some embodiments, the audio component 1910 further includes a speaker to output audio signals.

The I/O interface 1912 provides an interface between the processing component 1902 and peripheral interface modules, such as a keyboard, a click wheel, buttons, and the like. The buttons may include, but are not limited to, a home button, a volume button, a starting button, and a locking button.

The sensor component 1916 includes one or more sensors to provide status assessments of various aspects of the device 1900. For instance, the sensor component 814 may detect an open/closed status of the device 1900, relative positioning of components, e.g., the display and the keypad, of the device 1900, a change in position of the device 1900 or a component of the device 1900, a presence or absence of user contact with the device 1900, an orientation or an acceleration/deceleration of the device 1900, and a change in temperature of the device 1900. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 1918 is configured to facilitate communication, wired or wirelessly, between the device 1900 and other devices. The device 1900 can access a wireless network based on a communication standard, such as Wi-Fi, 2G, 3G, 4G, 5G or 6G, or a combination thereof. In one embodiment, the communication component 1918 receives a broadcast signal or broadcast associated information from an external broadcast management system via a broadcast channel. In one embodiment, the communication component 1918 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 1900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 1904, executable by the processor 1920 in the device 1900, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for channel transmission, comprising:

mapping respectively, by a terminal based on a predetermined mapping mode, different beam indication information to be received by corresponding different transmission and receiving points (TRPs) of a base station, to a plurality of candidate repetition occasions; wherein the beam indication information is beam related information for transmission of a physical uplink shared channel (PUSCH); and performing, by the terminal, transmitting repeatedly a transmission block on the PUSCH, on a plurality of target repetition occasions, based on beam indication information corresponding respectively to the plurality of target repetition occasions;

wherein mapping respectively, by the terminal based on the predetermined mapping mode, the different beam indication information to be received by the corresponding different TRPs of the base station, to the plurality of candidate repetition occasions, comprises:

mapping respectively, by the terminal based on the predetermined mapping mode, the different beam indication information to K2' actual repetition occasions; wherein the K2' actual repetition occasions are actual repetition occasions obtained by dividing K2 nominal repetition occasions, and the K2 nominal repetition occasions are back-to-back continuously allocated;

wherein the K2' actual repetition occasions comprise a first actual repetition occasion and a plurality of second actual repetition occasions, the first actual repetition occasion is a repetition occasion at which the transmission of the PUSCH is unable to be performed in the K2' actual repetition occasions, and the plurality of second actual repetition occasions are repetition occasions at which the transmission of the PUSCH are performed in the K2' actual repetition occasions; and performing, by the terminal, transmitting repeatedly the transmission block on the PUSCH, on the plurality of target repetition occasions, based on the beam indication information corresponding respectively to the plurality of target repetition occasions comprises:

taking the plurality of second actual repetition occasions as the plurality of target repetition occasions; and transmitting repeatedly the transmission block on the PUSCH on the plurality of second actual repetition occasions, based on beam indication information corresponding to the plurality of second actual repetition occasions.

2. The method of claim 1, wherein, mapping respectively, by the terminal based on the predetermined mapping mode, the different beam indication information to be received by the corresponding different TRPs of the base station, to the plurality of candidate repetition occasions, comprises:

mapping respectively, by the terminal based on the predetermined mapping mode, the different beam indication information to K1 nominal repetition occasions; wherein the K1 nominal repetition occasions are located respectively within different slots, start symbol positions of the K1 nominal repetition occasions within the slots are same, and a number of continuous symbols in each of the slots is same.

3. The method of claim 2, wherein, transmitting repeatedly the transmission block on the PUSCH on the plurality of target repetition occasions, based on the beam indication information corresponding to the plurality of target repetition occasions, comprises:

taking a plurality of second repetition occasions in the K1 nominal repetition occasions as the plurality of target repetition occasions, in response to determining that there is a first repetition occasion in the K1 nominal repetition occasions; wherein the first repetition occasion is a repetition occasion at which the transmission of the PUSCH is unable to be performed in the K1 nominal repetition occasions, and the plurality of second repetition occasions are a plurality of repetition occasions at which the transmission of the PUSCH is able to be performed in the K1 nominal repetition occasions; and

| transmitting repeatedly the transmission block on the PUSCH on the plurality of second repetition occasions, based on beam indication information corresponding to the plurality of second repetition occasions.

4. The method of claim 2, wherein, transmitting repeatedly the transmission block on the PUSCH based on the beam indication information corresponding respectively to the plurality of target repetition occasions, comprises:

taking the K1 nominal repetition occasions as the plurality of target repetition occasions, in response to determining that there is a first repetition occasion in the K1 nominal repetition occasions; wherein the first repetition occasion is a repetition occasion at which the transmission of the PUSCH is unable to be performed; and transmitting repeatedly the transmission block on the PUSCH on a plurality of second repetition occasions based on beam indication information corresponding to the plurality of second repetition occasions, and only transmitting separately the corresponding DMRS on the first repetition occasion; wherein the plurality of second repetition occasions are a plurality of repetition occasions at which the transmission of the PUSCH is able to be performed in the K1 nominal repetition occasions.

5. The method of claim 4, wherein, only transmitting separately the corresponding DMRS on the first repetition occasion, comprises one of:

only transmitting separately the corresponding DMRS on the first target repetition occasion, based on beam indication information mapped to the first target repetition occasion; or only transmitting separately the corresponding DMRS on the first target repetition occasion, after determining the beam indication information corresponding to the first repetition occasion based on beam indication information corresponding to a third repetition occasion; wherein the third repetition occasion is a repetition occasion adjacent to the first repetition occasion in the K1 nominal repetition occasions.

6. The method of claim 1, wherein, mapping respectively, by the terminal based on the predetermined mapping mode, the different beam indication information to be received by the corresponding different TRPs of the base station, to the plurality of candidate repetition occasions, comprises:

mapping respectively, by the terminal based on the predetermined mapping mode, the different beam indication information to K1' actual repetition occasions; wherein the K1' actual repetition occasions are repetition occasions at which the transmission of the PUSCH is able to be performed in K1 nominal repetition occasions, the K1 nominal repetition occasions are located respectively within different slots, start symbol positions of the K1 nominal repetition occasions within the slots are same, and a number of continuous symbols in each of the slots is same.

7. The method of claim 6, wherein, transmitting repeatedly the transmission block on the PUSCH on the plurality of target repetition occasions, based on the beam indication information corresponding to the plurality of target repetition occasions, comprises:

taking the K1' actual repetition occasions as the plurality of target repetition occasions; and transmitting repeatedly the transmission block on the PUSCH on the K1' actual repetition occasions, based on beam indication information corresponding to the K1' actual repetition occasions.

8. The method of claim 1, wherein, mapping respectively, by the terminal based on the predetermined mapping mode, the different beam indication information to be received by the corresponding different TRPs of the base station, to the plurality of candidate repetition occasions, comprises:

mapping respectively, by the terminal based on the predetermined mapping mode, the different beam indication information to the K2 nominal repetition occasions.

9. The method of claim 8, wherein, transmitting repeatedly the transmission block on the PUSCH on the plurality of target repetition occasions, based on the beam indication information corresponding to the plurality of target repetition occasions, comprises:

taking a plurality of second actual repetition occasions as the plurality of target repetition occasions, in response to the K2 nominal repetition occasions being divided into the K2' actual repetition occasions and there being a first actual repetition occasion in the K2' actual repetition occasions; wherein the first actual repetition occasion is a repetition occasion at which the transmission of the PUSCH is unable to be performed in the K2' actual repetition occasions, and the plurality of second actual repetition occasions are a plurality of repetition occasions at which the transmission of the PUSCH is able to be performed in the K2' actual repetition occasions; and transmitting repeatedly the transmission block on the PUSCH on the plurality of second actual repetition occasions, based on beam indication information corresponding to the plurality of second actual repetition occasions.

10. The method of claim 8, wherein, transmitting repeatedly the transmission block on the PUSCH, based on the beam indication information corresponding respectively to the plurality of target repetition occasions, comprises:

taking the K2' actual repetition occasions as the plurality of target repetition occasions, in response to the K2 nominal repetition occasions being divided into the K2' actual repetition occasions and there being a first actual repetition occasion in the K2' actual repetition occasions; wherein the first actual repetition occasion is an actual repetition occasion at which the transmission of the PUSCH is unable to be performed in the K2' actual repetition occasions; and transmitting repeatedly the transmission block on the PUSCH on a plurality of second actual repetition occasions based on beam indication information corresponding to the plurality of second actual repetition occasions, and only transmitting separately the corresponding DMRS on the first actual repetition occasion; wherein the plurality of second actual repetition occasions are a plurality of repetition occasions at which the transmission of the PUSCH is able to be performed in the K2' actual repetition occasions.

11. The method of claim 1, wherein, transmitting repeatedly the transmission block on the PUSCH, based on the beam indication information corresponding respectively to the plurality of target repetition occasions, comprises:

taking the K2' actual repetition occasions as the plurality of target repetition occasions, in response to determining that there is a first actual repetition occasion in the K2' actual repetition occasions; wherein the first actual repetition occasion is a repetition occasion at which the transmission of the PUSCH is unable to be performed in the K2' actual repetition occasions; and transmitting repeatedly the transmission block on the PUSCH on a plurality of second actual repetition occasion based on beam indication information corresponding to the plurality of second actual repetition occasions, and only transmitting separately the corresponding DMRS on the first actual repetition occasion; wherein the plurality of actual second repetition occasions are actual repetition occasions at which the transmission of the PUSCH is able to be performed in the K2' actual repetition occasions.

12. The method of claim 1, wherein, mapping respectively, by the terminal based on the predetermined mapping mode, the different beam indication information to be received by the corresponding different TRPs of the base station, to the plurality of candidate repetition occasions, comprises:

mapping respectively, by the terminal based on the predetermined mapping mode, the different beam indication information to K2" actual repetition occasions; wherein the K2" actual repetition occasions are repetition occasions at which the transmission of the PUSCH is able to be performed in the K2' actual repetition occasions.

13. The method of claim 12, wherein, transmitting repeatedly the transmission block on the PUSCH on the plurality of target repetition occasions, based on the beam indication information corresponding to the plurality of target repetition occasions, comprises:

taking the K2" actual repetition occasions as the plurality of target repetition occasions; and transmitting repeatedly the transmission block on the PUSCH on the K2" actual repetition occasions, based on beam indication information corresponding to the K2" actual repetition occasions.

14. The method of claim 12, wherein, transmitting repeatedly the transmission block on the PUSCH, based on the beam indication information corresponding respectively to the plurality of target repetition occasions, comprises:

taking the K2' actual repetition occasions as the plurality of target repetition occasions; and transmitting repeatedly the transmission block on the PUSCH on the K2" actual repetition occasions based on beam indication information corresponding to the K2" actual repetition occasions, and only transmitting separately the corresponding DMRS on a first actual repetition occasion; wherein the first actual repetition occasion is a repetition occasion at which the transmission of the PUSCH is unable to be performed in the K2' actual repetition occasions.

15. The method of claim 10, wherein, only transmitting separately the corresponding DMRS on the first actual repetition occasion, comprises one of:

only transmitting separately the corresponding DMRS on the first actual repetition occasion, based on beam indication information mapped to the first actual repetition occasion; or only transmitting separately the corresponding DMRS on the first target repetition occasion, in response to determining the beam indication information corresponding to the first actual repetition occasion based on beam indication information corresponding to a third actual repetition occasion; wherein the third actual repetition occasion is an actual repetition occasion adjacent to the first actual repetition occasion in the K2' actual repetition occasions.

16. The method of claim 1, further comprising at least one of:

acquiring the mapping mode from the base station through a first signaling;

determining the mapping mode based on association information for indicating the mapping mode from the base station through a second signaling; or determining the mapping mode based on a predefined configuration, wherein, mapping respectively, by the terminal based on the predetermined mapping mode, the different beam indication information to be received by the corresponding different TRPs of the base station, to the plurality of candidate repetition occasions, comprises at least one of:

cyclically mapping the different beam indication information to the plurality of candidate repetition occasions based on a preset sequence;

mapping the different beam indication information to the plurality of candidate repetition occasions based on a preset sequence after repeating the different beam indication information a specified number of times;

averagely mapping the different beam indication information to the plurality of candidate repetition occasions based on a preset number of PUSCH repetitions; or mapping the different beam indication information to the plurality of candidate repetition occasions based on a preset sequence, after determining a mapping sequence corresponding to the different beam indication information, indicated by association information based on a predetermined corresponding relationship between the association information and the different beam indication information.

17. A non-transitory computer-readable storage medium having stored thereon a computer program that, when executed by a processor of a terminal, cause the terminal to perform a method for channel transmission, the method comprising:

mapping respectively, by the terminal based on a predetermined mapping mode, different beam indication information to be received by corresponding different transmission and receiving points (TRPs) of a base station, to a plurality of candidate repetition occasions; wherein the beam indication information is beam related information for transmission of a physical uplink shared channel (PUSCH); and performing, by the terminal, transmitting repeatedly a transmission block on the PUSCH, on a plurality of target repetition occasions, based on beam indication information corresponding respectively to the plurality of target repetition occasions;

wherein mapping respectively, by the terminal based on the predetermined mapping mode, the different beam indication information to be received by the corresponding different TRPs of the base station, to the plurality of candidate repetition occasions, comprises:

mapping respectively, by the terminal based on the predetermined mapping mode, the different beam indication information to K2' actual repetition occasions; wherein the K2' actual repetition occasions are actual repetition occasions obtained by dividing K2 nominal repetition occasions, and the K2 nominal repetition occasions are back-to-back continuously allocated;

wherein the K2' actual repetition occasions comprise a first actual repetition occasion and a plurality of second actual repetition occasions, the first actual repetition occasion is a repetition occasion at which the transmission of the PUSCH is unable to be performed in the K2' actual repetition occasions, and the plurality of second actual repetition occasions are repetition occasions at which the transmission of the PUSCH are performed in the K2' actual repetition occasions; and performing, by the terminal, transmitting repeatedly the transmission block on the PUSCH, on the plurality of target repetition occasions, based on the beam indication information corresponding respectively to the plurality of target repetition occasions comprises:

taking the plurality of second actual repetition occasions as the plurality of target repetition occasions; and transmitting repeatedly the transmission block on the PUSCH on the plurality of second actual repetition occasions, based on beam indication information corresponding to the plurality of second actual repetition occasions.

18. A device for channel transmission, comprising:

a processor; and a memory configured to store instructions executable by the processor;

wherein the processor is configured to:

map respectively, based on a predetermined mapping mode, different beam indication information to be received by corresponding different transmission and receiving points (TRPs) of a base station, to a plurality of candidate repetition occasions; wherein the beam indication information is beam related information for transmission of a physical uplink shared channel (PUSCH); and perform transmitting repeatedly a transmission block on the PUSCH, on a plurality of target repetition occasions, based on beam indication information corresponding respectively to the plurality of target repetition occasions;

wherein mapping respectively, by a terminal based on the predetermined mapping mode, the different beam indication information to be received by the corresponding different TRPs of the base station, to the plurality of candidate repetition occasions, comprises:

mapping respectively, by the terminal based on the predetermined mapping mode, the different beam indication information to K2' actual repetition occasions; wherein the K2' actual repetition occasions are actual repetition occasions obtained by dividing K2 nominal repetition occasions, and the K2 nominal repetition occasions are back-to-back continuously allocated;

wherein the K2' actual repetition occasions comprise a first actual repetition occasion and a plurality of second actual repetition occasions, the first actual repetition occasion is a repetition occasion at which the transmission of the PUSCH is unable to be performed in the K2' actual repetition occasions, and the plurality of second actual repetition occasions are repetition occasions at which the transmission of the PUSCH are performed in the K2' actual repetition occasions; and performing, by the terminal, transmitting repeatedly the transmission block on the PUSCH, on the plurality of target repetition occasions, based on the beam indication information corresponding respectively to the plurality of target repetition occasions comprises:

taking the plurality of second actual repetition occasions as the plurality of target repetition occasions; and transmitting repeatedly the transmission block on the PUSCH on the plurality of second actual repetition occasions, based on beam indication information corresponding to the plurality of second actual repetition occasions.

* * * * *